(12) United States Patent
Sakai et al.

(10) Patent No.: US 11,764,717 B2
(45) Date of Patent: Sep. 19, 2023

(54) LINEAR MOTOR SYSTEM

(71) Applicant: Panasonic Intellectual Property Management Co., Ltd., Osaka (JP)

(72) Inventors: Hayata Sakai, Osaka (JP); Toru Tazawa, Osaka (JP); Kenta Murakami, Osaka (JP); Yusuke Nonogaki, Osaka (JP); Renya Kawakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/793,868

(22) PCT Filed: Dec. 23, 2020

(86) PCT No.: PCT/JP2020/048208
§ 371 (c)(1),
(2) Date: Jul. 19, 2022

(87) PCT Pub. No.: WO2021/157239
PCT Pub. Date: Aug. 12, 2021

(65) Prior Publication Data
US 2023/0053662 A1   Feb. 23, 2023

(30) Foreign Application Priority Data
Feb. 4, 2020   (JP) .................................. 2020-016794

(51) Int. Cl.
*B65G 35/06*   (2006.01)
*H02P 25/064*   (2016.01)
(Continued)

(52) U.S. Cl.
CPC ............ *H02P 25/064* (2016.02); *H02P 6/006* (2013.01); *H02P 6/16* (2013.01); *H02P 6/28* (2016.02)

(58) Field of Classification Search
CPC ....... B65G 35/06; G05B 19/02; H02P 25/064; H02P 6/28; H02P 6/006; H02P 6/16
See application file for complete search history.

(56) References Cited

U.S. PATENT DOCUMENTS

| 2012/0187873 A1 | 7/2012 | Nomura | |
| 2013/0282192 A1* | 10/2013 | Futami | ................... G05B 19/02 700/287 |

(Continued)

FOREIGN PATENT DOCUMENTS

| JP | 2831166 B2 | 12/1998 |
| JP | 5421709 B2 | 2/2014 |

(Continued)

OTHER PUBLICATIONS

International Search Report dated Feb. 22, 2021 in International Patent Application No. PCT/JP2020/048208, with English translation.

(Continued)

*Primary Examiner* — Cortez M Cook
(74) *Attorney, Agent, or Firm* — McDermott Will & Emery LLP

(57) ABSTRACT

A linear motor system includes: a stator including first to tenth coils; a mover including a permanent magnet; a switcher that switches one or more power supply target coils; and first to tenth amplifiers provided in one-to-one correspondence with first to tenth coils. One or more amplifiers that serve as new one or more power supply target amplifiers immediately after the switching calculate $\Delta\theta$ (t0), which is a position deviation at time t=t0, based on $\Delta\theta$ (t0)=$\Delta\theta$ (t0−td)+A−B, where A is a difference between an (Continued)

instructed position at time t=t0 and an instructed position at time t=t0−td, and B is a difference between an actual position at time t=t0 and an actual position at time t=t0−td, and supply power to the power supply target coils by the position deviation $\Delta\theta$ (t0).

6 Claims, 12 Drawing Sheets

(51) Int. Cl.
  *H02P 6/28* (2016.01)
  *H02P 6/00* (2016.01)
  *H02P 6/16* (2016.01)

(56) References Cited

U.S. PATENT DOCUMENTS

| | | |
|---|---|---|
| 2014/0257554 A1 | 9/2014 | Takagi |
| 2015/0035458 A1 | 2/2015 | Takase et al. |
| 2015/0303841 A1* | 10/2015 | Suzuki .................. B65G 35/06 318/38 |

FOREIGN PATENT DOCUMENTS

| | | |
|---|---|---|
| JP | 5648722 B1 | 1/2015 |
| JP | 2015-208083 A | 11/2015 |

OTHER PUBLICATIONS

Extended European Search Report dated Jun. 28, 2023 issued in the corresponding European Patent Application No. 20917383.0.

* cited by examiner

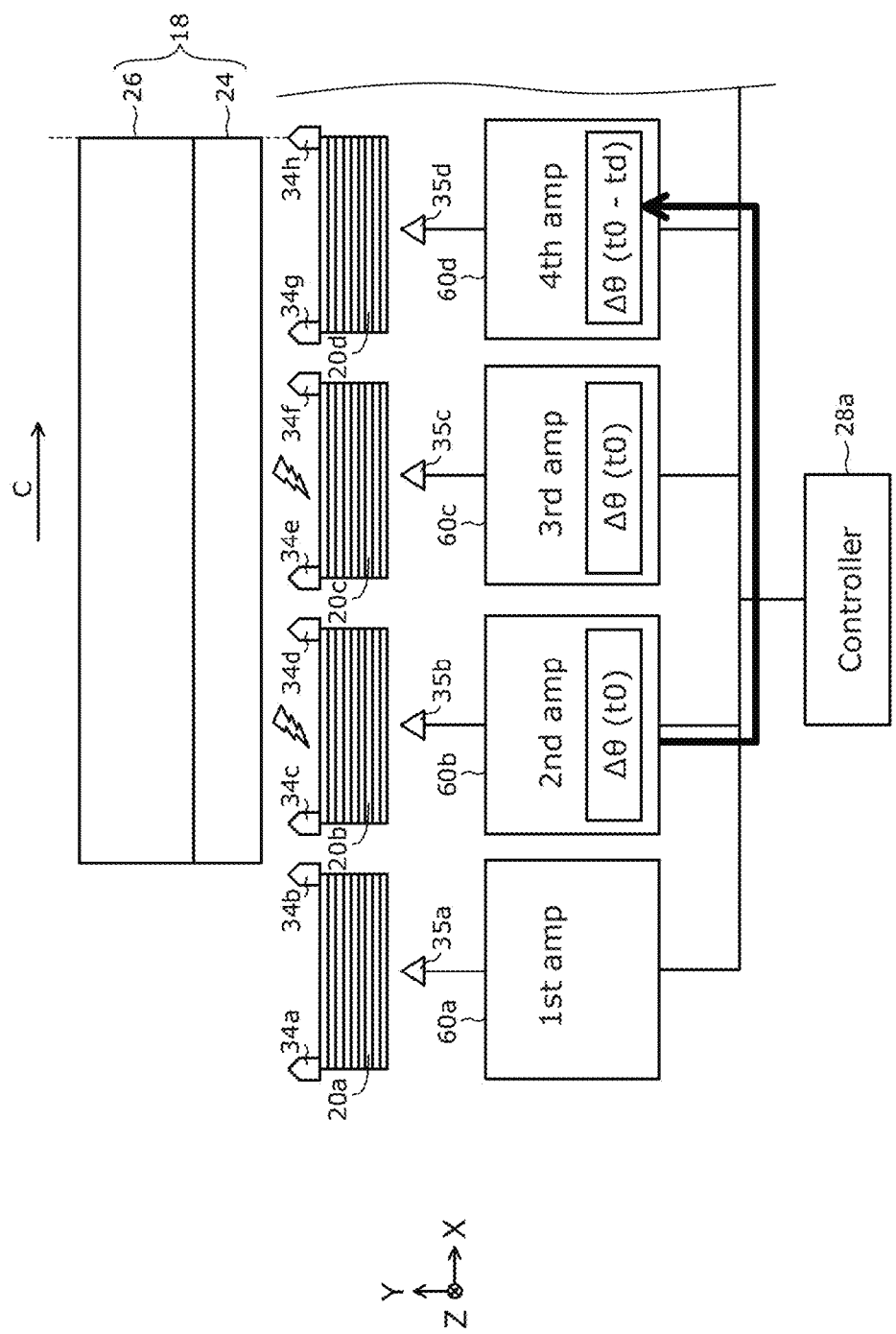

LINEAR MOTOR SYSTEM

CROSS-REFERENCE OF RELATED APPLICATIONS

This application is the U.S. National Phase under 35 U.S.C. § 371 of International Patent Application No. PCT/JP2020/048208, filed on Dec. 23, 2020, which in turn claims the benefit of Japanese Patent Application No. 2020-016794, filed on Feb. 4, 2020, the entire disclosures of which Applications are incorporated by reference herein.

TECHNICAL FIELD

The present invention relates to a moving magnet type linear motor system.

BACKGROUND ART

A moving magnet type linear motor system in which a permanent magnet is moved relative to coils is conventionally known.

For example, Patent Literature (PTL) 1 discloses a linear motor control system that includes a plurality of coil units that are disposed in sequence, a plurality of encoders that detect a plurality of positions of carriages that move across the plurality of coil units, a plurality of control deviation calculators that each calculate deviation information that is a difference between the detected position of the carriage and a target position, and a plurality of position controllers that each calculate an electric current control signal based on the deviation information. Each control deviation calculator transmits the deviation information to a control deviation information selector, and the control deviation information selector selects a position controller and transmits the deviation information to the selected position controller.

CITATION LIST

Patent Literature

[PTL 1]
Japanese Unexamined Patent Application Publication No. 2015-208083

SUMMARY OF INVENTION

Technical Problem

However, in the linear motor control system disclosed in PTL 1, a communication delay occurs between the time when the control deviation calculator transmits deviation information and the time when the position controller receives the deviation information, and thus it has been difficult to make the deviation information of the plurality of position controllers to be the same, as a result of which, the accuracy of position control decreases.

Accordingly, it is an object of the present invention to provide a linear motor system, with which it is possible to suppress a reduction in the accuracy of position control.

Solution to Problem

A linear motor system according to one aspect of the present disclosure is a linear motor system including: a stator including a plurality of coils that are arranged in a line; a mover including a permanent magnet disposed opposite to the plurality of coils; a switcher that performs: (i) selecting, from among the plurality of coils, one or more coils each including a region that extends across opposite ends in an arrangement direction and faces the permanent magnet as one or more power supply target coils that serve as power supply targets; and (ii) switching the one or more power supply target coils in response to a movement of the permanent magnet; and a plurality of control units provided in one-to-one correspondence with the plurality of coils, wherein each of the plurality of control units includes: a position deviation calculation unit that calculates a position deviation that is a difference between an instructed position of the mover and an actual position of the mover obtained by subtracting the actual positon of the mover from the instructed position of the mover; a speed control unit that generates a torque instruction based on the position deviation; and a current control unit that supplies power to the one or more power supply target coils based on the torque instruction, and when one or more control units out of the plurality of control units that correspond to the one or more power supply target coils are defined as one or more power supply target control units: the one or more power supply target control units immediately before the switching transmit $\Delta\theta$ (t0−td), which is the position deviation at time t=t0−td, to one or more control units that serve as new one or more power supply target control units immediately after the switching; and the one or more control units that serve as the new one or more power supply target control units immediately after the switching: (i) receive the position deviation $\Delta\theta$ (t0−td) at time t=t0; (ii) calculate $\Delta\theta$ (t0), which is the position deviation at time t=t0, based on $\Delta\theta$ (t0)=$\Delta\theta$ (t0−td)+A−B, where A is a difference between the instructed position at time t=t0 and the instructed position at time t=t0−td, and B is a difference between the actual position at time t=t0 and the actual position at time t=t0−td; and (iii) supply power to the one or more power supply target coils by using the position deviation $\Delta\theta$ (t0) when the new one or more power supply target control units immediately after the switching serve as the one or more power supply target control units.

Advantageous Effects of Invention

With the linear motor system according to the aspect of the present disclosure, it is possible to suppress a reduction in the accuracy of position control.

BRIEF DESCRIPTION OF DRAWINGS

FIG. 11 is an illustrative diagram illustrating an example of an operation performed by the linear motor system shown in FIG. 9, showing a state at time t=t0.

Figure 1A:
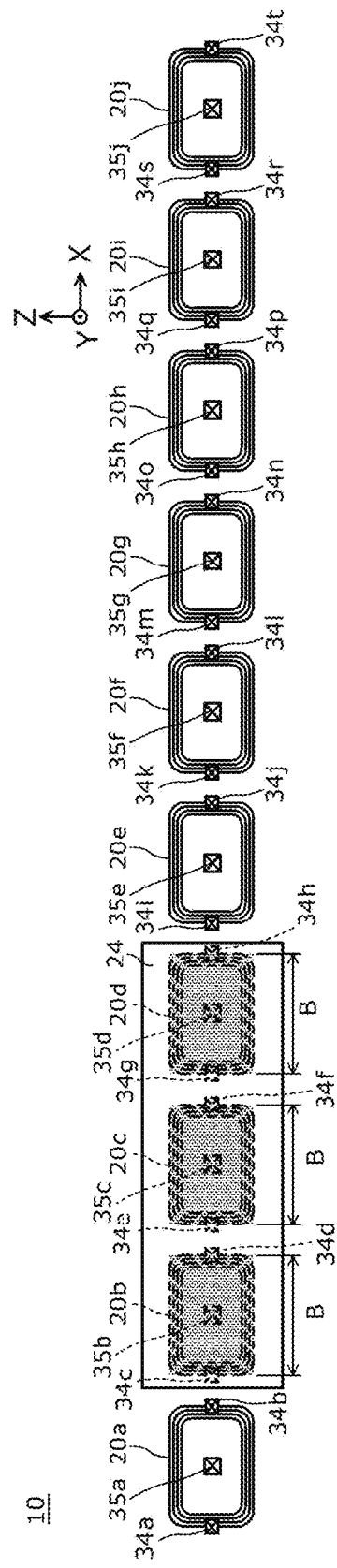
FIG. 1A is a diagram showing a configuration of a linear motor system according to Embodiment 1, as viewed from a transverse direction.

DESCRIPTION OF EMBODIMENTS (Background for Obtaining One Aspect of the Present Disclosure)

As described above, in the linear motor system disclosed in PTL 1, the accuracy of position control decreases.

For this reason, the inventors conducted in-depth studies and experiments to suppress the reduction in the accuracy of position control. As a result, the inventors found that, as a result of one of the plurality of control units that has received a position deviation performing correction calculation for the received position deviation, it is possible to make the position deviation of a transmission source control unit and the position deviation of a transmission destination control unit to be the same, and therefore suppress the reduction in the accuracy of position control.

The inventors further conducted in-depth studies and experiments based on the findings, and arrived at a linear motor system according to one aspect of the present disclosure described below.

A linear motor system according to one aspect of the present disclosure is a linear motor system including: a stator including a plurality of coils that are arranged in a line; a mover including a permanent magnet disposed opposite to the plurality of coils; a switcher that performs: (i) selecting, from among the plurality of coils, one or more coils each including a region that extends across opposite ends in an arrangement direction and faces the permanent magnet as one or more power supply target coils that serve as power supply targets; and (ii) switching the one or more power supply target coils in response to a movement of the permanent magnet; and a plurality of control units provided in one-to-one correspondence with the plurality of coils, wherein each of the plurality of control units includes: a position deviation calculation unit that calculates a position deviation that is a difference between an instructed position of the mover and an actual position of the mover obtained by subtracting the actual positon of the mover from the instructed position of the mover; a speed control unit that generates a torque instruction based on the position deviation; and a current control unit that supplies power to the one or more power supply target coils based on the torque instruction, and when one or more control units out of the plurality of control units that correspond to the one or more power supply target coils are defined as one or more power supply target control units: the one or more power supply target control units immediately before the switching transmit $\Delta\theta$ (t0−td), which is the position deviation at time t=t0−td, to one or more control units that serve as new one or more power supply target control units immediately after the switching; and the one or more control units that serve as the new one or more power supply target control units immediately after the switching: (i) receive the position deviation $\Delta\theta$ (t0−td) at time t=t0; (ii) calculate $\Delta\theta$ (t0), which is the position deviation at time t=t0, based on $\Delta\theta$ (t0)=$\Delta\theta$ (t0−td)+A−B, where A is a difference between the instructed position at time t=t0 and the instructed position at time t=t0−td, and B is a difference between the actual position at time t=t0 and the actual position at time t=t0−td; and (iii) supply power to the one or more power supply target coils by using the position deviation $\Delta\theta$ (t0) when the new one or more power supply target control units immediately after the switching serve as the one or more power supply target control units.

According to the linear motor system configured as described above, one or more power supply target control units immediately before switching the one or more power supply target coils transmit position deviation $\Delta\theta$ (t0−td) at time t=t0−td to one or more control units that serve as new one or more power supply target control units immediately after the switching. The one or more control units receive position deviation $\Delta\theta$ (t0−td) at time t=t0, and calculate position deviation $\Delta\theta$ (t0) at time t=t0 based on $\Delta\theta$ (t0)=$\Delta\theta$ (t0−td)+A−B, where a difference between an instructed position at time t=t0 and an instructed position at time t=t0−td is represented by difference A, and a difference between an actual position at time t=t0 and an actual position at time t=t0−td is represented by difference B. Also, when the new one or more power supply target control units immediately after the switching serve as the one or more power supply target control units, the one or more control units supply power to one or more power supply target coils by using position deviation $\Delta\theta$ (t0). Accordingly, even when a delay occurs between the time when the one or more power supply target control units immediately before the switching transmits position deviation $\Delta\theta$ (t0−td) and the time when the one or more control units receive position deviation $\Delta\theta$ (t0−td), the one or more control units can calculate position deviation $\Delta\theta$ (t0). As a result, the position deviation of the one or more power supply target control units immediately before the switching and the position deviation of the one or more control units can be made the same, and it is therefore possible to suppress a reduction in the accuracy of position control.

Also, the linear motor system may further include a superordinate control unit that transmits the instructed position to the plurality of control units, and the position deviation $\Delta\theta$ (t0−td) may be transmitted to the one or more control units that serve as the new one or more power supply target control units immediately after the switching via the superordinate control unit.

Also, the linear motor system may further include a filter that attenuates a high-frequency component of a position instruction from the superordinate control unit.

Also, the linear motor system may further include a plurality of displacement detectors that are provided in one-to-one correspondence with the plurality of coils and the plurality of control units, and the one or more control units that serve as the new one or more power supply target control units immediately after the switching may calculate a difference between a displacement of the mover at time t=t0−td and a displacement of the mover at time t=t0 based on a result of detection of corresponding one of the plurality of displacement detectors, and use the difference as difference B.

Also, the one or more control units that serve as the new one or more power supply target control units immediately after the switching may serve as the one or more power supply target control units at time t=t0.

Also, the linear motor system may further include a plurality of position detectors provided at opposite ends of each of the plurality of coils in the arrangement direction. In each of the plurality of coils, when one of the position detectors that is provided on a forward side in a moving direction of the permanent magnet in the arrangement direction detects a leading end of the permanent magnet, the switcher may select the coil on which the position detector is disposed as one of the one or more power supply target coils, and when another one of the position detectors that is provided on a rearward side in the moving direction of the permanent magnet in the arrangement direction detects a trailing end of the permanent magnet, the switcher may not select the coil on which the position detector is disposed as the one of the one or more power supply target coils.

Hereinafter, a specific example of a linear motor system according to one aspect of the present disclosure will be described with reference to the drawings. The embodiments described below show generic or specific examples. The numerical values, shapes, materials, structural elements, the arrangement and connection of the structural elements, and the like shown in the following embodiments are merely examples, and therefore are not intended to limit the scope of the present disclosure.

In addition, the diagrams are schematic representations, and thus are not necessarily true to scale. Also, in the diagrams, structural elements that are substantially the same are given the same reference numerals, and a redundant description may be omitted or simplified.

Also, in the diagrams that are referred to in the description of the embodiments given below, a coordinate system may be shown. The X axis direction in the coordinate system is an arrangement direction in which a plurality of coils are arranged. The Y axis direction in the coordinate system is a direction that is orthogonal to the X axis direction, and is a transverse direction that is orthogonal to the arrangement direction. Also, the Z axis direction in the coordinate system is a direction that is orthogonal to the X axis direction, and is also orthogonal to the Y axis direction.

Embodiment 1

Hereinafter, linear motor system 10 according to Embodiment 1 will be described with reference to the drawings.

Figure 1B:
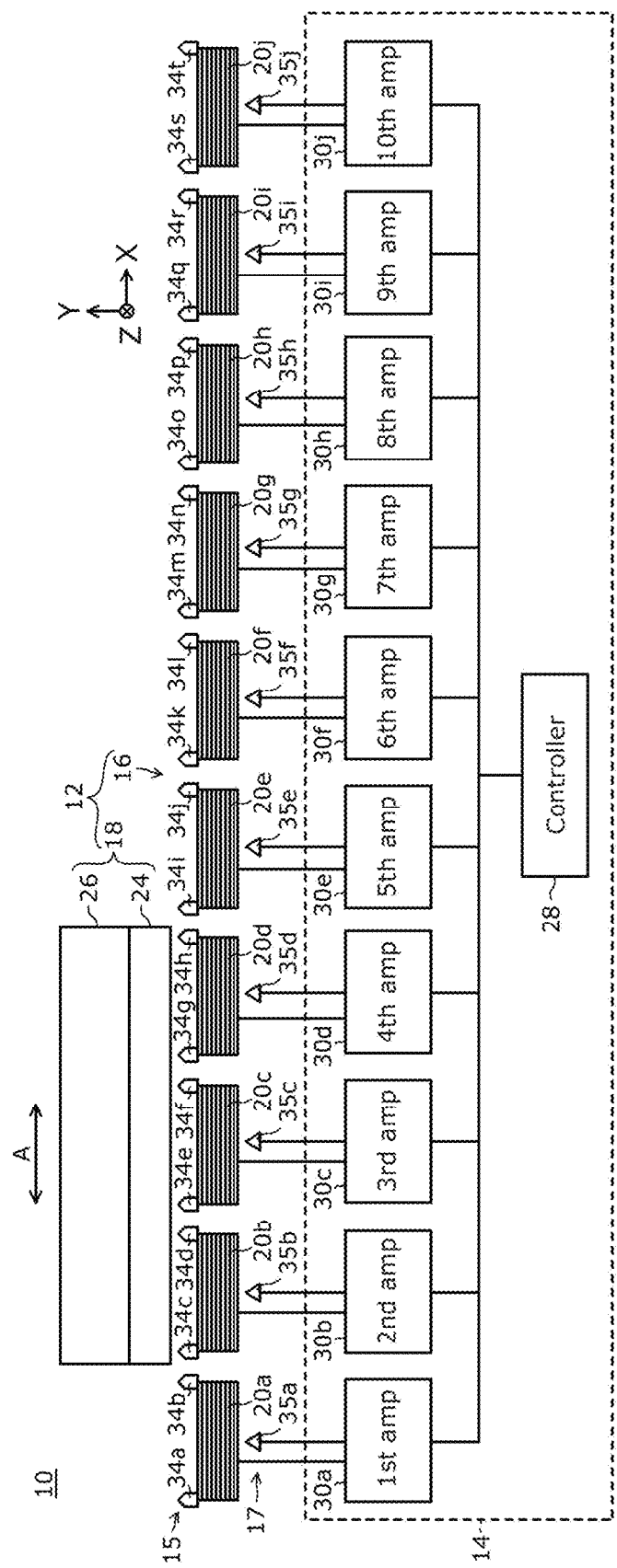
FIG. 1B is a diagram showing the configuration of the linear motor system shown in FIG. 1A, as viewed from a direction that is orthogonal to the transverse direction and is also orthogonal to an arrangement direction.

FIG. 1A is a diagram showing a configuration of linear motor system 10 according to Embodiment 1, as viewed from a transverse direction. FIG. 1B is a diagram showing the configuration of linear motor system 10 shown in FIG. 1A, as viewed from a direction that is orthogonal to the transverse direction and is also orthogonal to an arrangement direction. In FIG. 1A, in order to avoid complex drawings, carrier 26 and the like are not illustrated. The configuration of linear motor system 10 according to Embodiment 1 will be described with reference to FIGS. 1A and 1B.

As shown in FIGS. 1A and 1B, linear motor system 10 includes linear motor 12, control device 14, position detection device 15, and scale detection device 17.

Linear motor 12 includes stator 16 and mover 18 that is movable relative to stator 16. Linear motor 12 is a moving magnet type linear motor in which permanent magnet 24 (which will be described later) moves relative to first to tenth coils 20a to 20j (which will be described later).

Stator 16 includes first to tenth coils 20a to 20j. As described above, stator 16 includes a plurality of (ten in the present embodiment) coils. Stator 16 may include eleven or more coils, or nine or less coils.

First to tenth coils 20a to 20j are arranged in a line, and fixed to a base (not shown). First to tenth coils 20a to 20j are linearly arranged, but may be arranged in a curve. Also, first to tenth coils 20a to 20j are disposed at a regular interval, but are not necessarily disposed at a regular interval. As shown in FIG. 1A, each of first to tenth coils 20a to 20j is wound in the transverse direction (Y axis direction) that is orthogonal to the arrangement direction (X axis direction) in which first to tenth coils 20a to 20j are arranged, and is disposed so as to be open in the transverse direction.

Mover 18 includes permanent magnet 24 and carrier 26 that is attached to permanent magnet 24.

Permanent magnet 24 is disposed opposite to first to tenth coils 20a to 20j in the transverse direction. Specifically, permanent magnet 24 is disposed opposite to a few of first to tenth coils 20a to 20j in the transverse direction. Permanent magnet 24 is movable along first to tenth coils 20a to 20j in the arrangement direction (see arrow A shown in FIG. 1B). Permanent magnet 24 has magnetic poles (not shown) aligned in the arrangement direction. For example, permanent magnet 24 has a plurality of N poles and a plurality of S poles, with the N poles and the S pole being alternately provided in the arrangement direction. Permanent magnet 24 is formed to have a size that entirely overlaps three adjacent coils out of first to tenth coils 20a to 20j when viewed from the transverse direction. In the state shown in FIGS. 1A and 1B, permanent magnet 24 is disposed to entirely overlap three adjacent coils, namely, second coil 20b, third coil 20c, and fourth coil 20d, out of first to tenth coils 20a to 20j when viewed from the transverse direction. In other words, in the state shown in FIGS. 1A and 1B, a region extending across opposite ends (see arrows B and dotted regions shown in FIG. 1A) of each of second coil 20b, third coil 20c, and fourth coil 20d in the arrangement direction when viewed from the transverse direction is disposed to face permanent magnet 24, and overlaps permanent magnet 24 when viewed from the transverse direction. The size of permanent magnet 24 is not limited thereto, and for example, permanent magnet 24 may be formed to have a size that entirely overlaps two adjacent coils out of first to tenth coils 20a to 20j when viewed from the transverse direction, or a size that entirely overlaps four or more adjacent coils out of first to tenth coils 20a to 20j when viewed from the transverse direction. Also, permanent magnet 24 may be formed in a substantially U shape that clamps first to tenth coils 20a to 20j in the transverse direction. Alternatively, permanent magnet 24 may be formed in a substantially U shape that clamps first to tenth coils 20a to 20j in a direction (Z axis direction) that is orthogonal to the arrangement direction and is also orthogonal to the transverse direction.

Control device 14 is a device that controls linear motor 12. Control device 14 causes mover 18 to move to a desired position relative to stator 16 by supplying power to one or more power supply target coils that serve as power supply targets out of first to tenth coils 20a to 20j. Control device 14 includes controller 28 and first to tenth amplifiers 30a to 30j that are connected to controller 28 and first to tenth coils 20a to 20j. As described above, control device 14 includes a plurality of (ten in the present embodiment) amplifiers. In the present embodiment, controller 28 corresponds to the superordinate control unit, and first to tenth amplifiers 30a to 30j correspond to the plurality of control units.

Controller 28 recognizes the position of permanent magnet 24 based on information from position detection device 15, and selects one or more power supply target coils according to the position of permanent magnet 24. Controller 28 is capable of communicating with first to tenth amplifiers 30*a* to 30*j*, and transmits a position instruction to first to tenth amplifiers 30*a* to 30*j*. In the state shown in FIGS. 1A and 1B, second coil 20*b*, third coil 20*c*, and fourth coil 20*d* correspond to the power supply target coils.

First to tenth amplifiers 30*a* to 30*j* are provided in one-to-one correspondence with first to tenth coils 20*a* to 20*j*, respectively. Specifically, first amplifier 30*a* is provided in correspondence with first coil 20*a*, and second amplifier 30*b* is provided in correspondence with second coil 20*b*. The same applies to third to tenth amplifiers 30*c* to 30*j*. Each of the one or more power supply target amplifiers that are amplifiers out of first to tenth amplifiers 30*a* to 30*j* that correspond to the selected one or more power supply target coils supplies power to the corresponding power supply target coil by using a position deviation that is a difference between the instructed position of mover 18 and the actual position of mover 18. In the state shown in FIGS. 1A and 1B, second amplifier 30*b*, third amplifier 30*c*, and fourth amplifier 30*d* correspond to the power supply target amplifiers. In the state shown in FIGS. 1A and 1B, second amplifier 30*b* supplies power to second coil 20*b* by using the position deviation, third amplifier 30*c* supplies power to third coil 20*c* by using the position deviation, and fourth amplifier 30*d* supplies power to fourth coil 20*d* by using the position deviation. In the present embodiment, the power supply target amplifiers correspond to the power supply target control units.

When power is supplied to each power supply target coil, the power supply target coil is magnetized, and permanent magnet 24 is pulled or pushed by the power supply target coil, which causes mover 18 to move. The magnetic poles of each power supply target coil can be changed by changing the flow direction of electric current supplied to the power supply target coil. For example, if electric current flows clockwise when viewed from mover 18 side in the transverse direction, mover 18 side of the power supply target coil in the transverse direction serves as the S pole, and the side of the power supply target coil opposite to mover 18 side serves as the N pole. Conversely, if electric current flows counterclockwise when viewed from mover 18 side in the transverse direction, mover 18 side of the power supply target coil serves as the N pole, and the side of the power supply target coil opposite to mover 18 side serves as the S pole. Each power supply target amplifier determines the flow direction of electric current supplied to the power supply target coil according to the positions of the magnetic poles (the N pole and the S pole) of permanent magnet 24.

Controller 28 sequentially switches each power supply target coil and supplies power to the power supply target coil in response to a movement of permanent magnet 24, and causes mover 18 to move to a desired position.

Position detection device 15 is a device that detects the position of permanent magnet 24. Position detection device 15 includes first to twentieth position sensors 34*a* to 34*t*.

First to twentieth position sensors 34*a* to 34*t* are disposed at opposite ends of each of first to tenth coils 20*a* to 20*j* in the arrangement direction. As described above, position detection device 15 includes a plurality of (twenty in the present embodiment) position sensors. First position sensor 34*a* and second position sensor 34*b* are disposed at opposite ends of first coil 20*a* in the arrangement direction, third position sensor 34*c* and fourth position sensor 34*d* are disposed at opposite ends of second coil 20*b* in the arrangement direction, fifth position sensor 34*e* and sixth position sensor 34*f* are disposed at opposite ends of third coil 20*c* in the arrangement direction, seventh position sensor 34*g* and eighth position sensor 34*h* are disposed at opposite ends of fourth coil 20*d* in the arrangement direction, and ninth position sensor 34*i* and tenth position sensor 34*j* are disposed at opposite ends of fifth coil 20*e* in the arrangement direction. Eleventh position sensor 34*k* and twelfth position sensor 34*l* are disposed at opposite ends of sixth coil 20*f* in the arrangement direction, thirteenth position sensor 34*m* and fourteenth position sensor 34*n* are disposed at opposite ends of seventh coil 20*g* in the arrangement direction, fifteenth position sensor 34*o* and sixteenth position sensor 34*p* are disposed at opposite ends of eighth coil 20*h* in the arrangement direction, seventeenth position sensor 34*q* and eighteenth position sensor 34*r* are disposed at opposite ends of ninth coil 20*i* in the arrangement direction, and nineteenth position sensor 34*s* and twentieth position sensor 34*t* are disposed at opposite ends of tenth coil 20*j* in the arrangement direction. In the present embodiment, first to twentieth position sensors 34*a* to 34*t* correspond to the plurality of position detectors.

Each of first to twentieth position sensors 34*a* to 34*t* detects permanent magnet 24 that faces the position sensor in the transverse direction. In the state shown in FIGS. 1A and 1B, first position sensor 34*a* and second position sensor 34*b* do not face permanent magnet 24 in the transverse direction, and thus transmit a signal indicating that they have not detected permanent magnet 24 to controller 28 and first to tenth amplifiers 30*a* to 30*j*. As a result, controller 28 and first to tenth amplifiers 30*a* to 30*j* recognize that the region extending across opposite ends of first coil 20*a* in the arrangement direction when viewed from the transverse direction does not face permanent magnet 24 in the transverse direction. In other words, as a result, controller 28 and first to tenth amplifiers 30*a* to 30*j* recognize that the entirety of first coil 20*a* does not overlap permanent magnet 24 when viewed from the transverse direction. The same applies to ninth to twentieth position sensors 34*i* to 34*t*. In contrast, third position sensor 34*c* and fourth position sensor 34*d* face permanent magnet 24 in the transverse direction, and thus transmit a signal indicating that they have detected permanent magnet 24 to controller 28 and first to tenth amplifiers 30*a* to 30*j*. As a result, controller 28 and first to tenth amplifiers 30*a* to 30*j* recognize that the region extending across opposite ends of second coil 20*b* in the arrangement direction when viewed from the transverse direction faces permanent magnet 24, and overlaps permanent magnet 24 in the transverse direction. In other words, as a result, controller 28 and first to tenth amplifiers 30*a* to 30*j* recognize that the entirety of second coil 20*b* overlaps permanent magnet 24 when viewed from the transverse direction. The same applies to fifth to eighth position sensors 34*e* to 34*h*.

Also, each of first to twentieth position sensors 34*a* to 34*t* detects a leading end and a trailing end of permanent magnet 24 in a movement direction in which permanent magnet 24 moves. For example, when first position sensor 34*a* faces the leading end of permanent magnet 24 in the movement direction in the transverse direction, first position sensor 34*a* transmits a signal indicating that the leading end of permanent magnet 24 has been detected to controller 28 and first to tenth amplifiers 30*a* to 30*j*. For example, first position sensor 34*a* detects the leading end of permanent magnet 24 by detecting a mark or the like that is attached to the leading end of permanent magnet 24. Likewise, when first position sensor 34*a* faces the trailing end of permanent magnet 24 in the movement direction in the transverse direction, first position sensor 34a transmits a signal indicating that the trailing end of permanent magnet 24 has been detected to controller 28 and first to tenth amplifiers 30a to 30j. For example, first position sensor 34a detects the trailing end of permanent magnet 24 by detecting a mark or the like that is attached to the trailing end of permanent magnet 24. The same applies to second to twentieth position sensors 34b to 34t.

Scale detection device 17 is a device that detects the actual position of mover 18. Scale detection device 17 includes first to tenths encoders 35a to 35j. As described above, scale detection device 17 includes a plurality of (ten in the present embodiment) encoders.

Each of first to tenths encoders 35a to 35j detects a displacement of mover 18. First to tenths encoders 35a to 35j are provided in one-to-one correspondence with first to tenth coils 20a to 20j and first to tenth amplifiers 30a to 30j. Specifically, first encoder 35a is provided in correspondence with first coil 20a and first amplifier 30a, and second encoder 35b is provided in correspondence with second coil 20b and second amplifier 30b. The same applies to third to tenth encoders 35c to 35j. Each of first to tenths encoders 35a to 35j is disposed at the center of the corresponding one of first to tenth coils 20a to 20j in the arrangement direction when viewed from the transverse direction (see FIG. 1A). First encoder 35a is disposed at the center of first coil 20a in the arrangement direction, second encoder 35b is disposed at the center of second coil 20b in the arrangement direction, third encoder 35c is disposed at the center of third coil 20c in the arrangement direction, fourth encoder 35d is disposed at the center of fourth coil 20d in the arrangement direction, and fifth encoder 35e is disposed at the center of fifth coil 20e in the arrangement direction when viewed from the transverse direction. Also, sixth encoder 35f is disposed at the center of sixth coil 20f in the arrangement direction, seventh encoder 35g is disposed at the center of seventh coil 20g in the arrangement direction, eighth encoder 35h is disposed at the center of eighth coil 20h in the arrangement direction, ninth encoder 35i is disposed at the center of eighth coil 20i in the arrangement direction, and tenth encoder 35j is disposed at the center of tenth coil 20j in the arrangement direction when viewed from the transverse direction. In the present embodiment, first to tenths encoders 35a to 35j correspond to the plurality of displacement detectors.

Each of first to tenths encoders 35a to 35j detects a displacement in the arrangement direction of mover 18 by reading a scale (not shown) provided in mover 18. Each of first to tenths encoders 35a to 35j reads the scale when the encoder faces mover 18 in the transverse direction.

Figure 2:
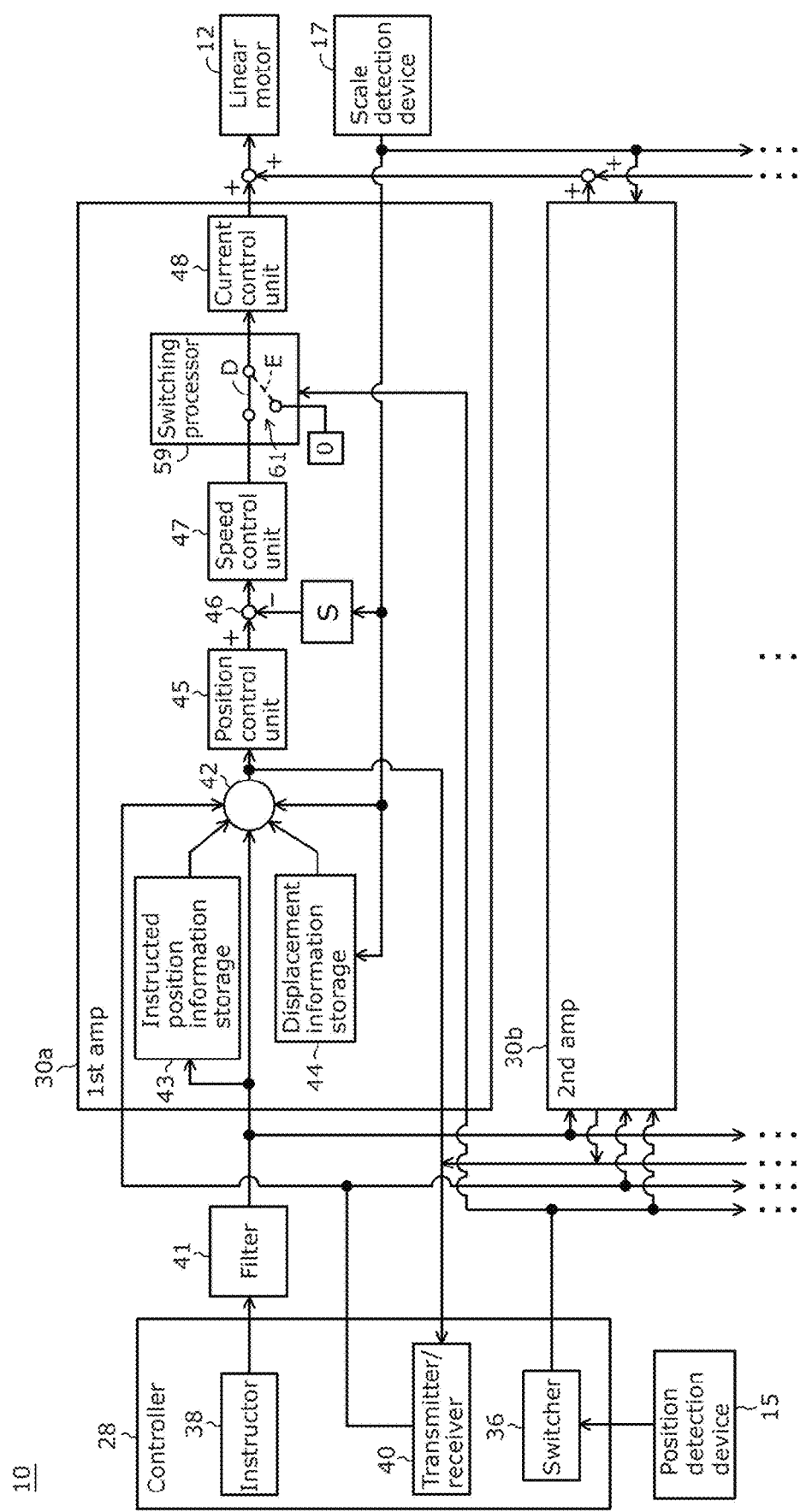
FIG. 2 is a block diagram showing a functional configuration of the linear motor system shown in FIG. 1A.

FIG. 2 is a block diagram showing a functional configuration of linear motor system 10 shown in FIG. 1A. The functional configuration of linear motor system 10 shown in FIG. 1A will be described with reference to FIG. 2.

Controller 28 includes switcher 36, instructor 38, and transmitter/receiver 40.

Switcher 36 is connected to position detection device 15, and selects one or more power supply target coils based on information from position detection device 15, and transmits, to switching processors 59 (which will be described later) that are included in first to tenth amplifiers 30a to 30j, a switching signal for determining whether the one or more power supply target coils are power supply targets. Specifically, switcher 36 selects, as one or more power supply target coils, one or more coils from among first to tenth coils 20a to 20j, the one or more coils being one or more coils whose region extending across opposite ends in the arrangement direction when viewed from the transverse direction entirely faces permanent magnet 24 in the transverse direction. Furthermore, switcher 36 transmits a switching signal that determines that the selected one or more coils are power supply targets to switching processors 59 of the one or more power supply target amplifiers. In other words, switcher 36 selects, as one or more power supply target coils, one or more coils from among first to tenth coils 20a to 20j, the one or more coils being one or more coils entirely overlapping permanent magnet 24 when viewed from the transverse direction. Furthermore, switcher 36 transmits a switching signal that determines that the selected one or more coils are power supply targets to switching processors 59 of the one or more power supply target amplifiers.

For example, when the position sensor on the forward side in the moving direction of permanent magnet 24 in the arrangement direction in each of first to tenth coils 20a to 20j detects the leading end of permanent magnet 24, switcher 36 selects the coil on which the position sensor is disposed as a power supply target coil. Furthermore, switcher 36 transmits a switching signal that determines that the selected coil is a power supply target to switching processor 59 of the power supply target amplifier. For example, as shown in FIGS. 1A and 1B, in the case where the moving direction of permanent magnet 24 is a direction extending from first coil 20a side toward tenth coil 20j side (plus X axis direction), when eighth position sensor 34h on the forward side in the moving direction of permanent magnet 24 detects the leading end of permanent magnet 24, switcher 36 selects fourth coil 20d on which eighth position sensor 34h is disposed as a power supply target coil. Furthermore, switcher 36 transmits a switching signal that determines that the selected coil is a power supply target to switching processor 59 of fourth amplifier 30d. The same applies to first to third coils 20a to 20c and fifth to tenth coils 20e to 20j.

Also, for example, when the position sensor on the rearward side in the moving direction of permanent magnet 24 in the arrangement direction in each of first to tenth coils 20a to 20j detects the trailing end of permanent magnet 24, switcher 36 does not select the coil on which the position sensor is disposed as a power supply target coil. Furthermore, switcher 36 transmits a switching signal that determines that the selected coil is not a power supply target to switching processor 59 of the amplifier that corresponds to the selected coil. For example, as shown in FIGS. 1A and 1B, in the case where the moving direction of permanent magnet 24 is a direction extending from first coil 20a side toward tenth coil 20j side (plus X axis direction), when third position sensor 34c on the rearward side in the moving direction of permanent magnet 24 detects the trailing end of permanent magnet 24, switcher 36 does not select second coil 20b on which third position sensor 34c is disposed as a power supply target coil. Furthermore, switcher 36 transmits a switching signal that determines that the selected coil is not a power supply target to switching processor 59 of second amplifier 30b. The same applies to first coil 20a and third to tenth coils 20c to 20j.

In the state shown in FIGS. 1A and 1B, switcher 36 selects second coil 20b, third coil 20c, and fourth coil 20d as power supply target coils. Furthermore, switcher 36 transmits a switching signal that determines that the selected coils are power supply targets to switching processors 59 of second amplifier 30b, third amplifier 30c, and fourth amplifier 30d. Also, when permanent magnet 24 moves as a result of power being supplied to the one or more power supply target coils, switcher 36 switches the one or more power supply target coils according to the position of permanent magnet 24.

Instructor 38 is connected to first to tenth amplifiers 30a to 30j via filter 41 (which will be described later), and transmits a position instruction to first to tenth amplifiers 30a to 30j. By transmitting a position instruction, instructor 38 transmits the instructed position of mover 18 to first to tenth amplifiers 30a to 30j.

Transmitter/receiver 40 is connected to first to tenth amplifiers 30a to 30j, and receives, before switcher 36 switches one or more power supply target coils, a position deviation from one or more power supply target amplifiers immediately before the switching. Also, transmitter/receiver 40 transmits the received position deviation to one or more amplifiers that serve as new one or more power supply target amplifiers immediately after the switching.

Linear motor system 10 further includes filter 41. Filter 41 attenuates a high-frequency component of the position instruction from instructor 38, and transmits the attenuated high-frequency component to first to tenth amplifiers 30a to 30j. Specifically, filter 41 attenuates a high-frequency component of the position instruction generated as a result of the position instruction being repeatedly transmitted from instructor 38, and transmits the attenuated high-frequency component to first to tenth amplifiers 30a to 30j. For example, filter 41 is a primary delay filter, a FIR (Finite Impulse Response) filter, or the like.

First amplifier 30a includes position deviation calculation unit 42, instructed position information storage 43, displacement information storage 44, position control unit 45, speed deviation calculation unit 46, speed control unit 47, current control unit 48, and switching processor 59.

Position deviation calculation unit 42 is connected to instructor 38 via filter 41, and receives the position instruction transmitted from instructor 38. Also, position deviation calculation unit 42 is connected to scale detection device 17, and acquires the actual position of permanent magnet 24, or in other words, the actual position of mover 18 detected by scale detection device 17. Position deviation calculation unit 42 calculates a position deviation that is the difference between the instructed position of mover 18 that is based on the position instruction and the actual position of mover 18 by subtracting the actual position of mover 18 from the instructed position of mover 18.

Also, although details will be given later, position deviation calculation unit 42 receives position deviation $\Delta\theta$ (t0−td) at time t=t0−td from transmitter/receiver 40, and performs correction calculation to calculate position deviation $\Delta\theta$ (t0) at time t=t0.

Each time an instructed position is transmitted from instructor 38, instructed position information storage 43 stores the instructed position. In the case where position deviation calculation unit 42 performs position deviation correction calculation, instructed position information storage 43 transmits the instructed position of mover 18 at a predetermined time to position deviation calculation unit 42.

Each time a displacement of mover 18 is transmitted from scale detection device 17, displacement information storage 44 stores the displacement. In the case where position deviation calculation unit 42 performs position deviation correction calculation, displacement information storage 44 transmits the displacement of mover 18 at a predetermined time to position deviation calculation unit 42.

Position control unit 45 generates a speed instruction by using the position deviation calculated by position deviation calculation unit 42, and transmits the speed instruction to speed deviation calculation unit 46.

Speed deviation calculation unit 46 calculates a speed deviation that is the difference between the instructed position of mover 18 that is based on the speed instruction from position control unit 45 and the actual speed of mover 18 obtained by differentiating the actual position of mover 18 detected by scale detection device 17.

Speed control unit 47 generates a torque instruction based on the position deviation calculated by position deviation calculation unit 42. Specifically, speed control unit 47 generates a torque instruction by using the speed deviation calculated based on the position deviation.

When a switching signal that determines that the coil is a power supply target is transmitted from switcher 36, switching processor 59 applies, to current control unit 48, the torque instruction output from speed control unit 47. When a switching signal that determines that the coil is not a power supply target is transmitted from switcher 36, switching processor 59 applies torque instruction 0 to current control unit 48. Specifically, switching processor 59 includes switch 61, and when a switching signal that determines that the coil is a power supply target is received from switcher 36, switching processor 59 switches switch 61 to a state in which speed control unit 47 and current control unit 48 are connected (see D shown in FIG. 2), and applies the torque instruction output from speed control unit 47 to current control unit 48. On the other hand, when a switching signal that determines that the coil is not a power supply target is received from switcher 36, switching processor 59 switches switch 61 to a state in which speed control unit 47 and current control unit 48 are not connected (see E shown in FIG. 2), and applies torque instruction 0 to current control unit 50.

Current control unit 48 supplies power to the one or more power supply target coils based on the generated torque instruction. For example, current control unit 48 sets a voltage value based on the received torque instruction, and supplies power to the one or more power supply target coils based on the set voltage value. As a result, permanent magnet 24 moves in the arrangement direction by being pulled by the one or more power supply target coils or pushed by the one or more power supply target coils.

Second to tenth amplifiers 30b to 30j have the same configuration as that of first amplifier 30a. Accordingly, the description of first amplifier 30a given above applies to second to tenth amplifiers 30b to 30j, and thus a detailed description of second to tenth amplifiers 30b to 30j is omitted.

Next, a description of an example of an operation performed by linear motor system 10 configured as described above will be given.

Figure 3:
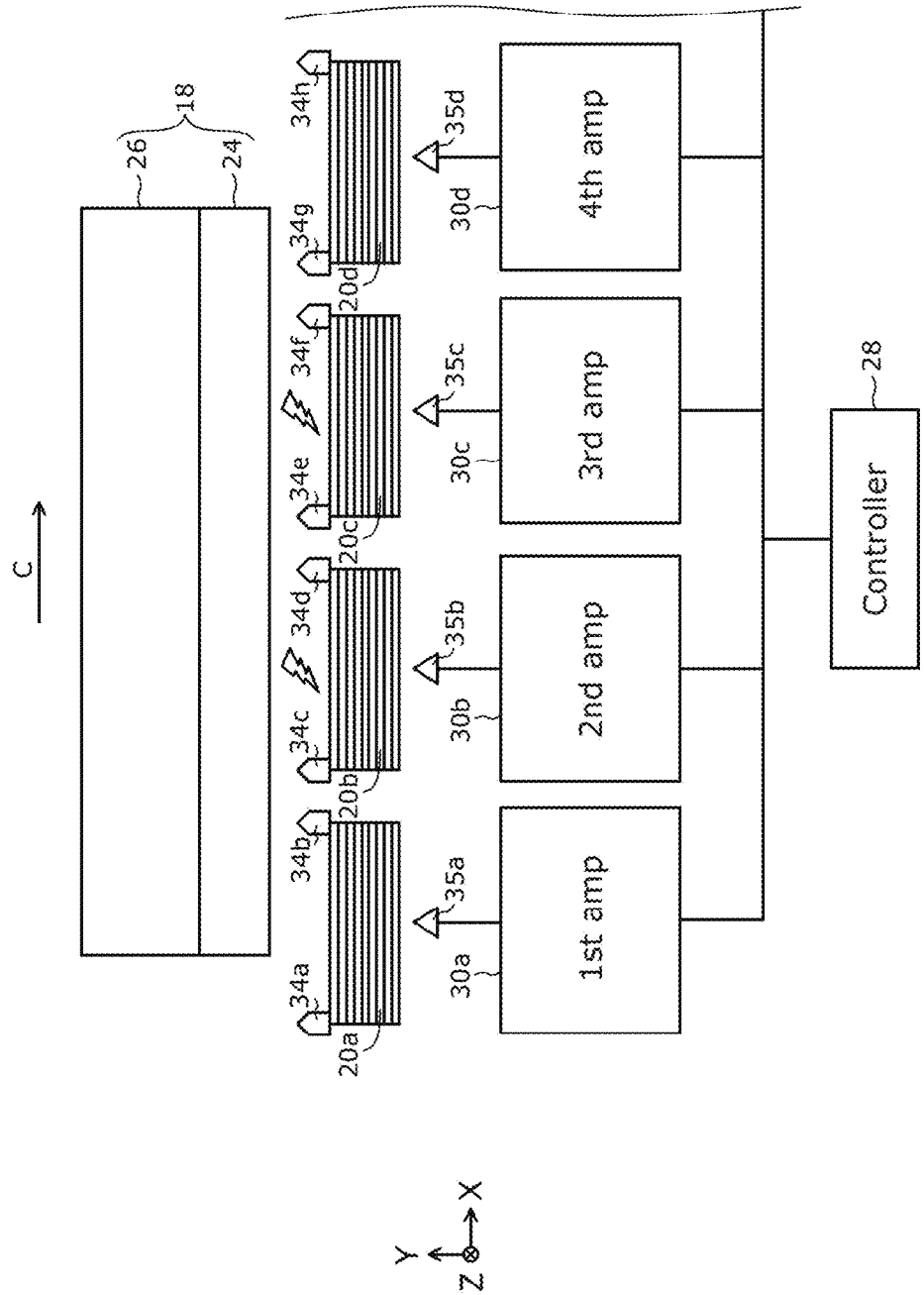
FIG. 3 is an illustrative diagram illustrating an example of an operation performed by the linear motor system shown in FIG. 1A, showing a state before time t=t0−td.
Figure 4:
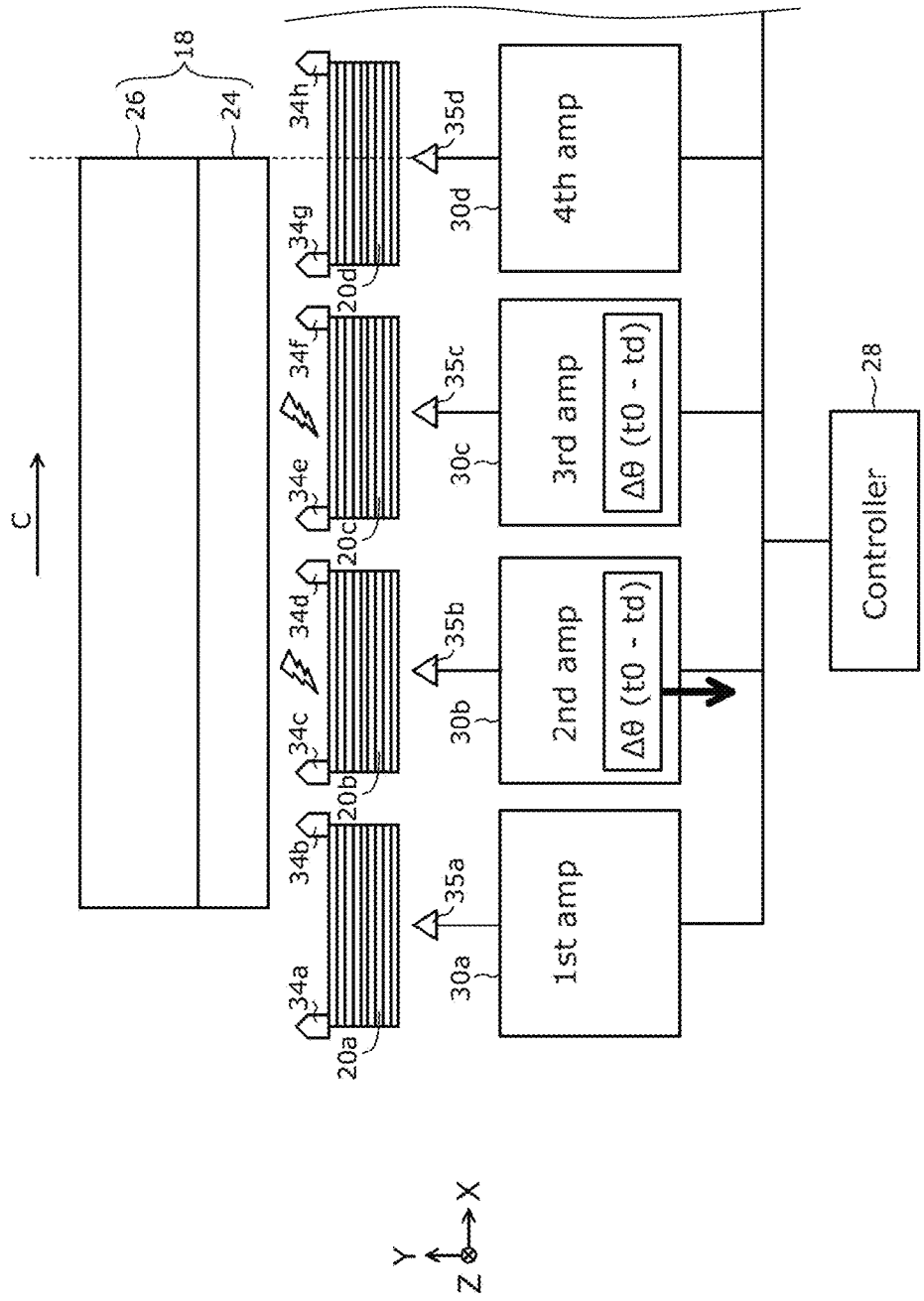
FIG. 4 is an illustrative diagram illustrating an example of an operation performed by the linear motor system shown in FIG. 1A, showing a state at time t=t0−td.
Figure 5:
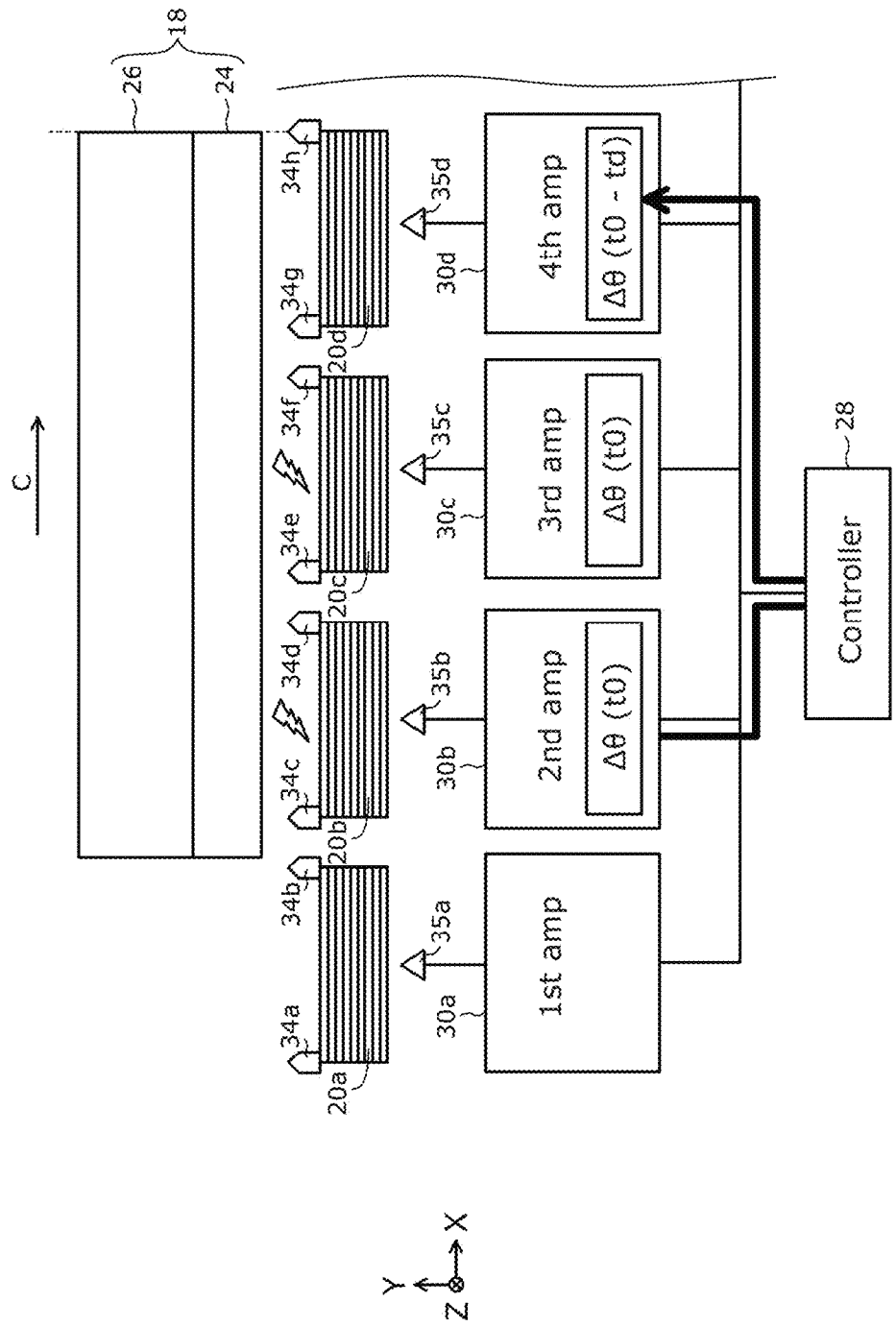
FIG. 5 is an illustrative diagram illustrating an example of an operation performed by the linear motor system shown in FIG. 1A, showing a state at time t=t0.
Figure 6:
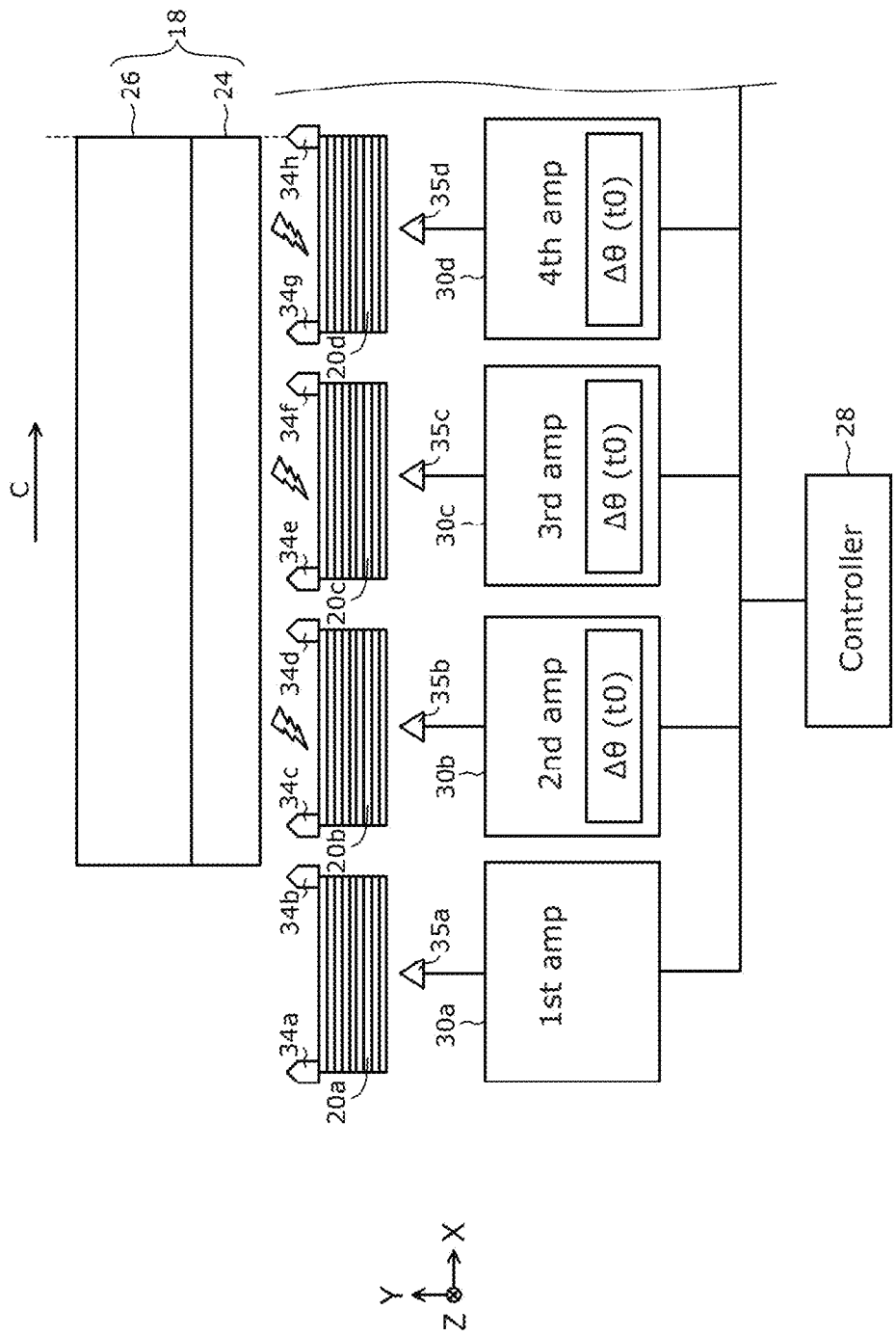
FIG. 6 is an illustrative diagram illustrating an example of an operation performed by the linear motor system shown in FIG. 1A, showing a state at time t=t0.

FIG. 3 is an illustrative diagram illustrating an example of an operation performed by linear motor system 10 shown in FIG. 1A, showing a state before time t=t0−td. FIG. 4 is an illustrative diagram illustrating an example of an operation performed by linear motor system 10 shown in FIG. 1A, showing a state at time t=t0−td. FIG. 5 is an illustrative diagram illustrating an example of an operation performed by linear motor system 10 shown in FIG. 1A, showing a state at time t=t0. FIG. 6 is an illustrative diagram illustrating an example of an operation performed by linear motor system 10 shown in FIG. 1A, showing a state at time t=t0. Examples of operations performed by linear motor system 10 will be described with reference to FIGS. 3 to 6.

In the state shown in FIG. 3, third position sensor 34c and fourth position sensor 34d that are disposed at opposite ends of second coil 20b in the arrangement direction both face permanent magnet 24 in the transverse direction, and detect permanent magnet 24. Also, fifth position sensor 34e and sixth position sensor 34f that are disposed at opposite ends of third coil 20c in the arrangement direction both face permanent magnet 24 in the transverse direction, and detect permanent magnet 24. Accordingly, the state shown in FIG. 3 is a state in which controller 28 has selected second coil 20b and third coil 20c as power supply target coils, and second amplifier 20b corresponding to second coil 20b and third amplifier 20c corresponding to third coil 20c serve as power supply target amplifiers.

In the state shown in FIG. 3, second amplifier 30b that has received a position instruction from controller 28 calculates a position deviation by subtracting the actual position of mover 18 from the instructed position of mover 18, and supplies power to second coil 20b that serves as a power supply target coil by using the calculated position deviation. Likewise, third amplifier 30c that has received a position instruction from controller 28 calculates a position deviation by subtracting the actual position of mover 18 from the instructed position of mover 18, and supplies power to third coil 20c that serves as a power supply target coil by using the calculated position deviation. As a result, mover 18 moves in the arrangement direction (see arrow C shown in FIG. 3). Here, an example will be described in which second amplifier 30b is set as the master axis.

Next, as shown in FIG. 4, at time t=t0−td, second amplifier 30b calculates position deviation Δθ (t0−td) at time t=t0−td by subtracting the actual position of mover 18 at time t=t0−td from the instructed position of mover 18 at time t=t0−td, and supplies power to second coil 20b by using position deviation Δθ (t0−td). Likewise, third amplifier 30c also calculates position deviation Δθ (t0−td) and supplies power to third coil 20c by using position deviation Δθ (t0−td).

Also, at time t=t0−td, second amplifier 30b that is set as the master axis transmits position deviation Δθ (t0−td) at time t=t0−td, via controller 28 (transmitter/receiver 40), to amplifiers that serve as new one or more power supply target amplifiers when one or more power supply target coils are switched next. Here, fourth amplifier 30d is one of the amplifiers that serve as new one or more power supply target amplifiers when one or more power supply target coils are switched next. As described above, second amplifier 30b that is one or more power supply target amplifiers immediately before one or more power supply target coils are switched transmits position deviation Δθ (t0−td) at time t=t0−td to fourth amplifier 30d that serves as new one or more power supply target amplifiers immediately after the switching. When third amplifier 30c is set as the master axis, third amplifier 30c may transmit position deviation Δθ (t0−td) at time t=t0−td, or any of one or more power supply target amplifiers may transmit position deviation Δθ (t0−td) at time t=t0−td.

Also, at time t=t0−td, fourth encoder 35d faces the leading end of mover 18 in the transverse direction, and starts to detect a displacement of mover 18. For example, fourth encoder 35d detects a displacement of mover 18 at time t=t0−td as 0. Fourth encoder 35d may not necessarily face the leading end of mover 18 at time t=t0−td as long as fourth encoder 35d faces at least mover 18 and can detect a displacement of mover 18 at time t=t0−td.

Next, as shown in FIG. 5, at time t=t0, second amplifier 30b calculates position deviation Δθ (t0) at time t=t0 by subtracting the actual position of mover 18 at time t=t0 from the instructed position of mover 18 at time t=t0, and supplies power to second coil 20b by using position deviation Δθ (t0).

Likewise, third amplifier 30c also calculates position deviation Δθ (t0), and supplies power to third coil 20c by using position deviation Δθ (t0).

Also, at time t=t0, fourth amplifier 30d receives position deviation Δθ (t0−td) from second amplifier 30b via controller 18. Although details will be given later, fourth amplifier 30d performs correction calculation by using received position deviation Δθ (t0−td), and calculates position deviation Δθ (t0) at time t=t0.

Also, at time t=t0, fourth encoder 35d faces mover 18 in the transverse direction, and measures the displacement of mover 18. For example, fourth encoder 35d detects the displacement of mover 18 at time t=t0 as 50.

Also, as shown in FIG. 6, at time t=t0, seventh position sensor 34g and eighth position sensor 34h that are disposed at opposite ends of fourth coil 20d in the arrangement direction both face permanent magnet 24 in the transverse direction and detect permanent magnet 24. Accordingly, at time t=t0, the one or more power supply target coils are switched, and fourth coil 20d is selected as a new power supply target coil. Accordingly, at time t=t0, fourth amplifier 30d that corresponds to fourth coil 20d is selected as a new power supply target amplifier, and supplies power to fourth coil 20d by using calculated position deviation Δθ (t0).

Figure 7:
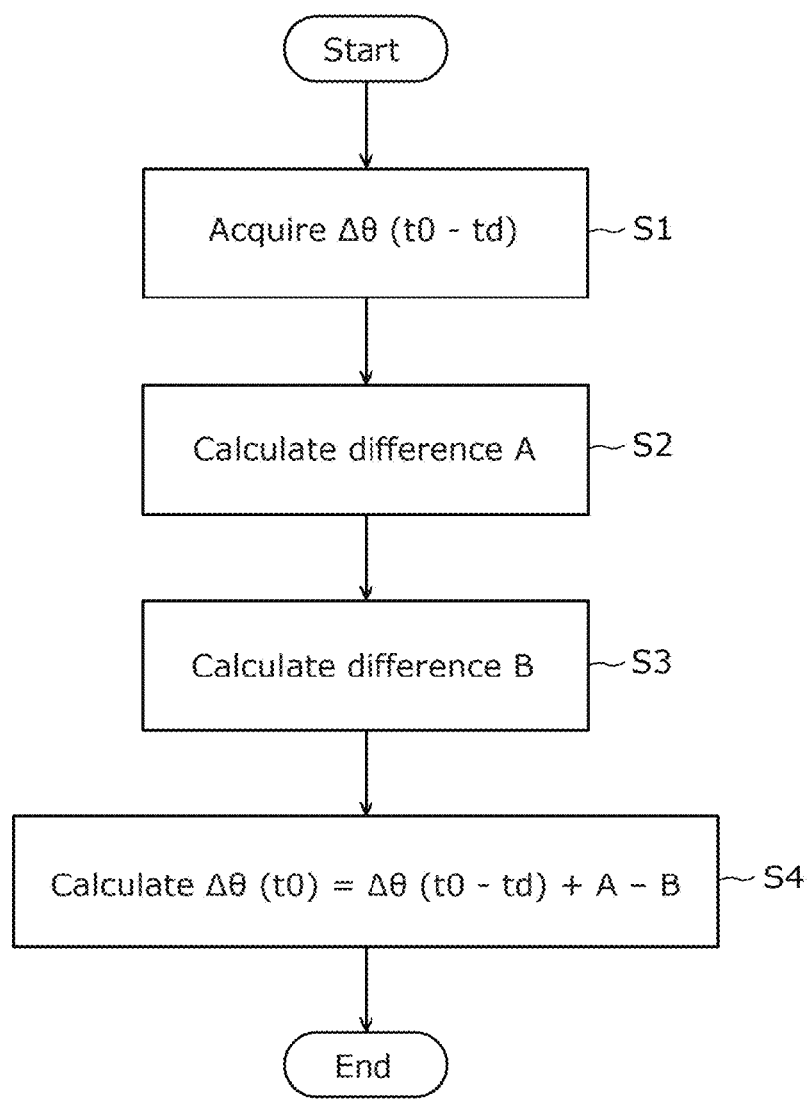
FIG. 7 is a flow diagram showing an example of an operation performed by one or more amplifiers that serve as new one or more power supply target amplifiers immediately after switching one or more power supply target coils in the linear motor system shown in FIG. 1A.
Figure 8:
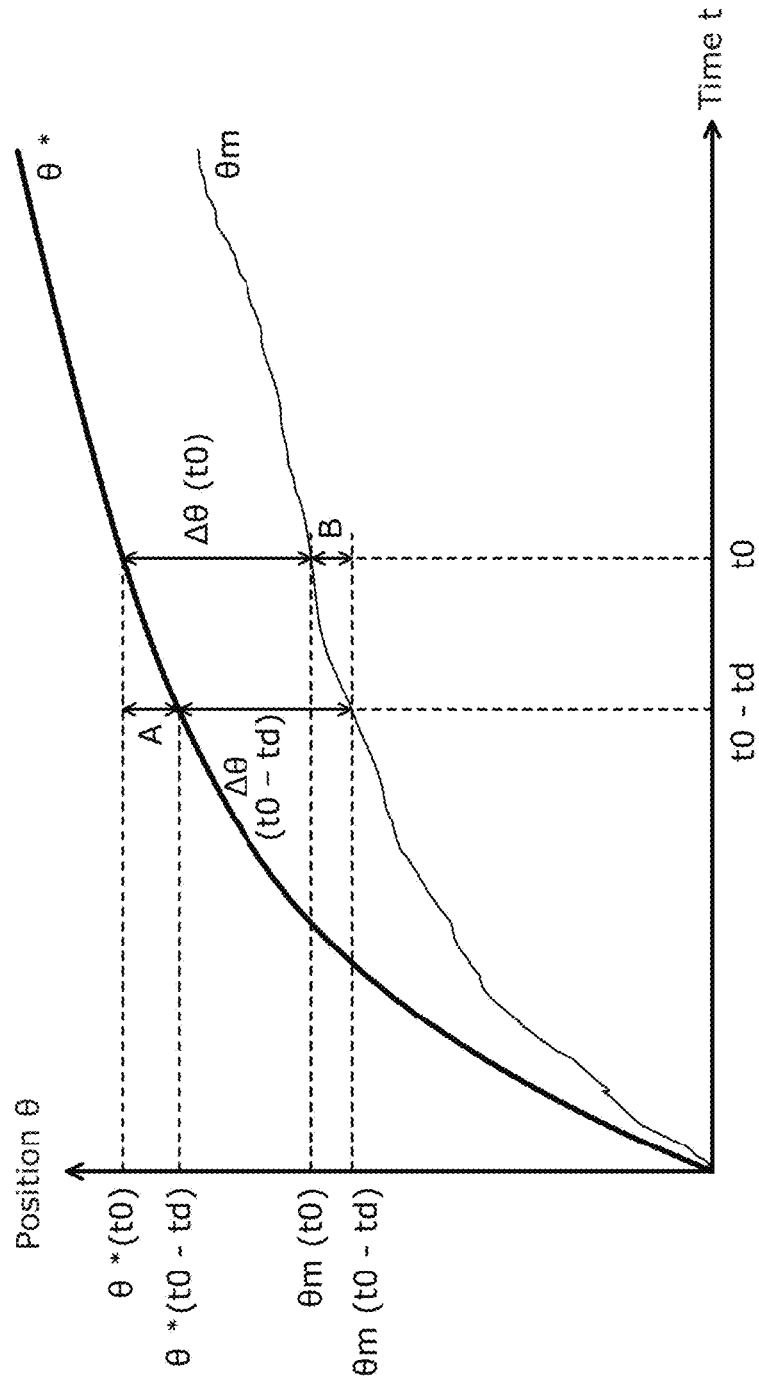
FIG. 8 is a graph showing a relationship between time and the position of a mover.

FIG. 7 is a flow diagram showing an example of an operation performed by each of one or more amplifiers that serve as new one or more power supply target amplifiers immediately after switching one or more power supply target coils in linear motor system 10 shown in FIG. 1A. FIG. 8 is a graph showing a relationship between time and the position of mover 18. An example of an operation of calculating Δθ (t0) performed by fourth amplifier 30d that serves as one of new one or more power supply target amplifiers immediately after switching one or more power supply target coils will be described with reference to FIGS. 7 and 8.

Referring to FIG. 7, first, as described above, at time t=t0, fourth amplifier 30d acquires position deviation Δθ (t0−td) at time t=t0−td (step S1).

Next, fourth amplifier 30d calculates difference A (step S2). As shown in FIG. 8, difference A is the difference between instructed position θ* (t0) at time t=t0 and instructed position θ* (t0−td) at time t=t0−td. Fourth amplifier 30d calculates difference A by subtracting instructed position θ* (t0−td) from instructed position θ* (t0). Instructed position θ* (t0−td) is stored in instructed position information storage 43.

Next, fourth amplifier 30d calculates difference B (step S3). As shown in FIG. 8, difference B is the difference between actual position θm (t0) at time t=t0 and actual position θm (t0−td) at time t=t0−td. Fourth amplifier 30d calculates the difference between the displacement of the mover at time t=t0−td and the displacement of the mover at time t=t0 based on a result of detection of fourth encoder 35d, and uses the calculated difference as difference B. Specifically, fourth amplifier 30d calculates the difference by subtracting the displacement of mover 18 at time t=t0−td from the displacement of mover 18 at time t=t0, and uses the calculated difference as difference B. For example, as described above, when fourth encoder 35d detects that the displacement of mover 18 at time t=t0−td is 0, and also detects that the displacement of the mover at time t=t0 is 50, fourth amplifier 30d calculates the difference by subtracting 0 from 50, and uses the calculated difference as difference B. The displacement of mover 18 at time t=t0−td is stored in displacement information storage 44.

Finally, fourth amplifier 30*d* calculates position deviation Δθ (t0) by adding difference A to position deviation Δθ (t0−td) and subtracting difference B (step S4). In this way, fourth amplifier 30*d* calculates position deviation Δθ (t0) based on Δθ (t0)=Δθ (t0−td)+A−B.

As described above, one or more power supply target amplifiers immediately before one or more power supply target coils are switched transmit position deviation Δθ (t0−td) at time t=t0−td to one or more amplifiers that serve as new one or more power supply target amplifiers immediately after the switching. Then, the one or more amplifiers that serve as new one or more power supply target amplifiers immediately after the switching calculate position deviation Δθ (t0) by using position deviation Δθ (t0−td), and supplies power to one or more power supply target coils by using position deviation Δθ (t0) when the new one or more power supply target amplifiers immediately after the switching serve as the one or more power supply target amplifiers. As a result, the position deviation of one or more power supply target amplifiers immediately before the switching and the position deviation of one or more amplifiers that serve as new one or more power supply target amplifiers immediately after the switching can be made the same, and it is therefore possible to suppress a reduction in the accuracy of position control. When one or more power supply target coils are switched, a switching signal that determines that the selected one or more coils are power supply targets is transmitted to switching processor 59 of each of one or more amplifiers that serve as new one or more power supply target amplifiers immediately after the switching.

With linear motor system 10 as described above, second amplifier 30*b* that serves as one of one or more power supply target amplifiers immediately before one or more power supply target coils are switched transmit position deviation Δθ (t0−td) at time t=t0−td to fourth amplifier 30*d* that serves as one of new one or more power supply target amplifiers immediately after the switching. Fourth amplifier 30*d* receives position deviation Δθ (t0−td) at time t=t0, and calculates position deviation Δθ (t0) at time t=t0 based on Δθ (t0)=Δθ (t0−td)+A−B, where the difference between the instructed position at time t=t0 and the instructed position at time t=t0−td is defined as difference A, and the difference between the actual position at time t=t0 and the actual position at time t=t0−td is defined as difference B. Also, fourth amplifier 30*d* supplies power to one or more power supply target coils by using position deviation Δθ (t0) when the new one or more power supply target amplifiers immediately after the switching serve as the one or more power supply target amplifiers. As described above, even if a delay occurs between the time when second amplifier 30*b* transmits position deviation Δθ (t0−td) and the time when fourth amplifier 30*d* receives position deviation Δθ (t0−td), fourth amplifier 30*d* can calculate position deviation Δθ (t0). As a result, the position deviations of second amplifier 30*b* and third amplifier 30*c* and the position deviation of fourth amplifier 30*d* can be made the same. Accordingly, it is possible to suppress a reduction in the accuracy of position control.

Also, the linear motor system includes controller 28 that transmits the instructed position to first to tenth amplifiers 30*a* to 30*j*, and position deviation Δθ (t0−td) is transmitted to fourth amplifier 30*d* that serves as one of new one or more power supply target amplifiers immediately after one or more power supply target coils are switched via controller 28. As described above, position deviation Δθ (t0−td) is transmitted to fourth amplifier 30*d* via controller 28 that is capable of communicating with first to tenth amplifiers 30*a* to 30*j*. Accordingly, position deviation Δθ (t0−td) can be easily transmitted to fourth amplifier 30*d*. At the time when one or more power supply target coils are switched, a switching signal that determines that the selected coil is a power supply target is transmitted to switching processor 59 of fourth amplifier 30*d*.

Also, the linear motor system further includes filter 41 that attenuates a high-frequency component of a position instruction from controller 28. With this configuration, the switching shock that occurs at the time when one or more power supply target coils are switched can be reduced.

Also, the linear motor system includes first to tenths encoders 35*a* to 35*j* that are provided in one-to-one correspondence with first to tenth coils 20*a* to 20*j* and first to tenth amplifiers 30*a* to 30*j*, and fourth amplifier 30*d* that serves as one of new one or more power supply target amplifiers immediately after one or more power supply target coils are switched calculates, based on a result of detection of fourth encoder 35*d* that is the corresponding one of first to tenths encoders 35*a* to 35*j*, a difference between the displacement of mover 18 at time t=t0−td and the displacement of mover 18 at time t=t0, and uses the calculated difference as difference B. Accordingly, difference B between the actual position of mover 18 at time t=t0 and the actual position of mover 18 at time t=t0−td can be easily calculated.

Also, fourth amplifier 30*d* that serves as one of new one or more power supply target amplifiers immediately after one or more power supply target coils are switched serves as one of one or more power supply target amplifiers at time t=t0. As a result, all of second amplifier 30*b*, third amplifier 30*c*, and fourth amplifier 30*d* can supply power by using position deviation Δθ (t0) at time t=t0, and it is therefore possible to suppress a reduction in the accuracy of position control. At the time when one or more power supply target coils are switched, a switching signal that determines that the selected coil is a power supply target is supplied to switching processor 59 of fourth amplifier 30*d*.

Specifically, t0 represents the time at which one or more amplifiers serve as new one or more power supply target amplifiers immediately after one or more power supply target coils are switched. td represents a communication delay (time) between the time when the amplifier that is set as a master axis transmits a position deviation of the master axis to one or more amplifiers that serve as new one or more power supply target amplifiers immediately after one or more power supply target coils are switched and the time when the one or more amplifiers receive the position deviation of the master axis.

For example, td can be used by each amplifier in the following manner. In the case where first amplifiers 30*a* to tenth amplifiers 30*j* are disposed at a predetermined pitch as shown in FIG. 1A, mover 18 overlaps three amplifiers (second amplifier 30*b*, third amplifier 30*c*, and fourth amplifier 30*d*) when viewed from the transverse direction, and thus, for example, first amplifier 30*a* transmits a dummy signal (including the transmitting time) to third amplifier 30*c* that is provided at a position two amplifiers away at the time of activation, third amplifier 30*c* calculates a difference between the receiving time at which the dummy signal was received and the transmitting time at which the dummy signal was transmitted, and sets the calculated difference as td. Next, third amplifier 30*c* transmits calculated difference td to first amplifiers 30*a* to second amplifier 30*b* and fourth amplifier 30*d* to tenth amplifiers 30*j*, and first amplifiers 30*a* to tenth amplifiers 30*j* store calculated difference td in the memories or the like of first amplifiers 30*a* to tenth amplifiers 30*j*. In the case where first amplifiers 30*a* to tenth amplifiers 30j are disposed at a plurality of pitches rather than at a predetermined pitch, td can be obtained by transmitting the dummy signal for each pitch.

Also, the linear motor system further includes first to twentieth position sensors disposed at opposite ends of each of first to tenth coils 20a to 20j in the arrangement direction. Switcher 36 is configured such that, when the position sensor on the forward side in the moving direction of permanent magnet 24 in the arrangement direction in each of in each of first to tenth coils 20a to 20j detects the leading end of permanent magnet 24, switcher 36 selects the coil on which the position sensor is disposed as a power supply target coil, and when the position sensor on the rearward side in the moving direction of permanent magnet 24 in the arrangement direction detects the trailing end of permanent magnet 24, switcher 36 does not select the coil on which the position sensor is disposed as a power supply target coil. With this configuration, switcher 36 can easily switch the power supply target coils.

Embodiment 2

Next, a description of Embodiment 2 will be given. Embodiment 2 is different from Embodiment 1 mainly in that each of the first to tenth amplifiers includes transmitter/receiver 40. The following description will be given focusing mainly on the difference from Embodiment 1.

Figure 9:
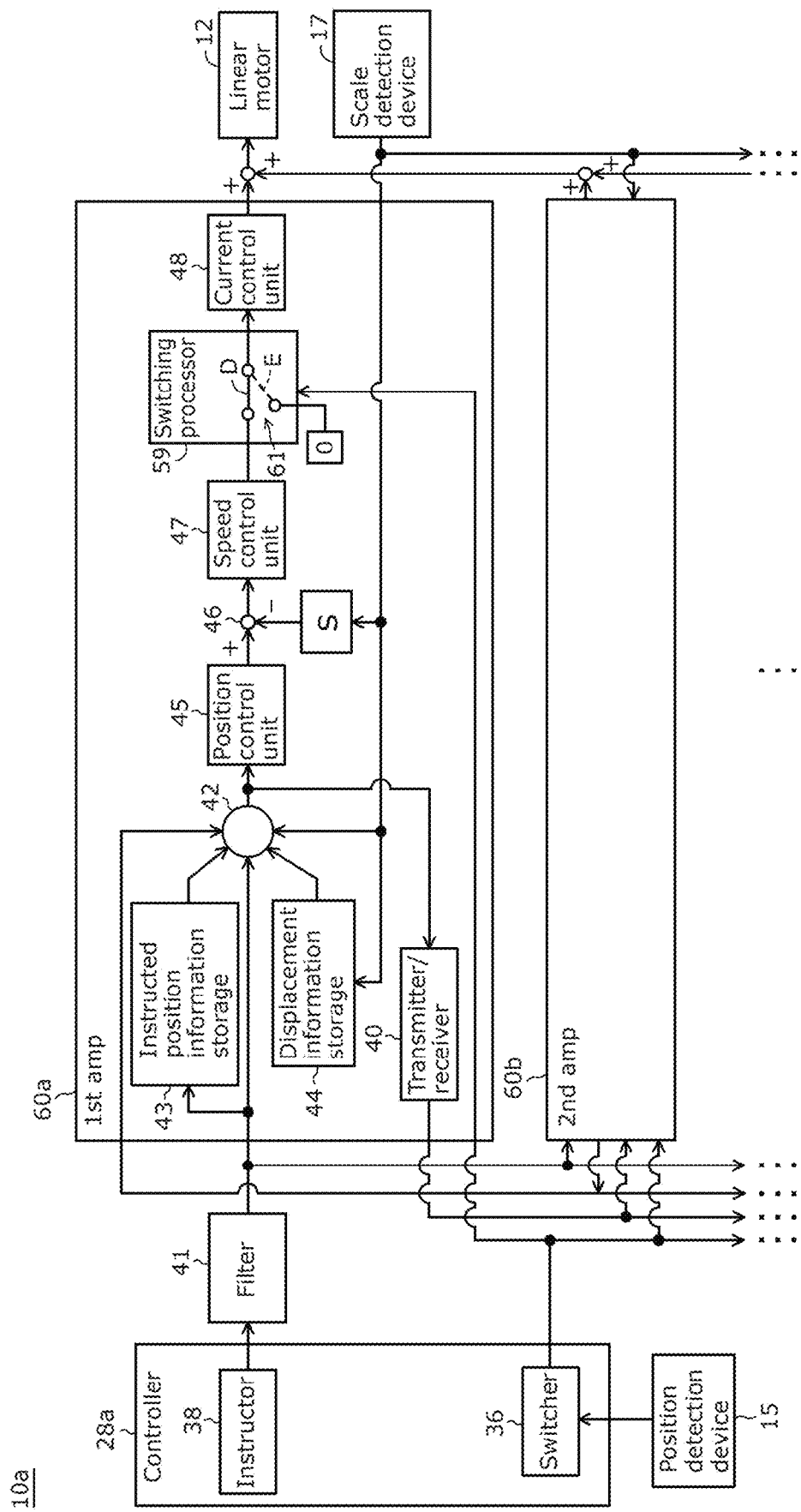
FIG. 9 is a block diagram showing a functional configuration of a linear motor system according to Embodiment 2.

FIG. 9 is a block diagram showing a functional configuration of linear motor system 10a according to Embodiment 2. As shown in FIG. 9, linear motor system 10a according to Embodiment 2 includes controller 28a, first amplifier 60a, and second amplifier 60b. Although not illustrated in FIG. 9, linear motor system 10a also includes third to tenth amplifiers.

Controller 28a is different from controller 28 in that controller 28a does not include transmitter/receiver 40.

First amplifier 60a is different from first amplifier 30a in that first amplifier 60a includes transmitter/receiver 40. Second amplifier 60b has the same configuration as that of first amplifier 60a. Also, the third to tenth amplifiers included in linear motor system 10a also have the same configuration as that of first amplifier 60a. In linear motor system 10a, first amplifier 60a, second amplifier 60b, and the third to tenth amplifiers are capable of communicating with each other.

Figure 10:
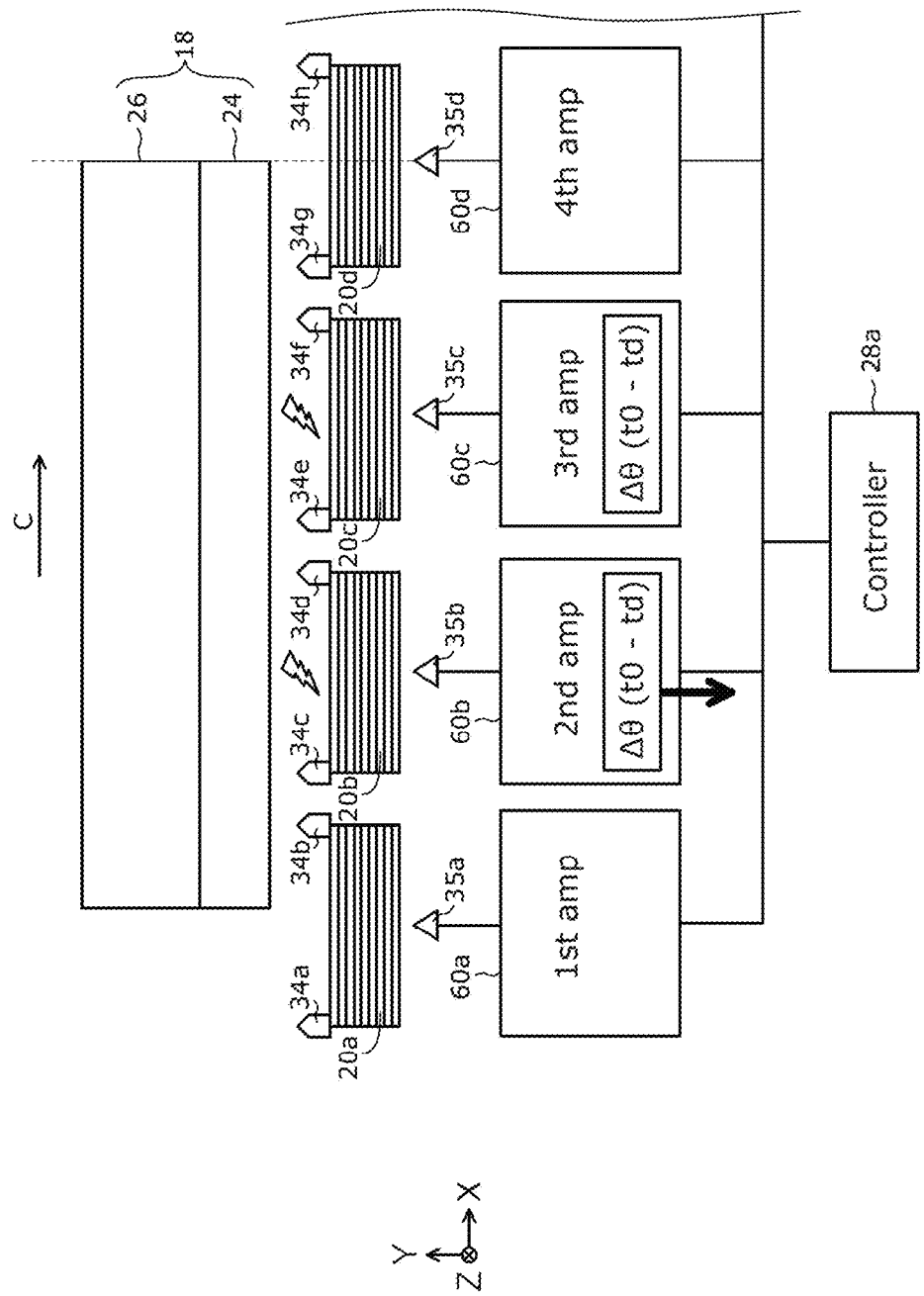
FIG. 10 is an illustrative diagram illustrating an example of an operation performed by the linear motor system shown in FIG. 9, showing a state at time t=t0−td.

FIG. 10 is an illustrative diagram illustrating an example of an operation performed by linear motor system 10a shown in FIG. 9, showing a state at time t=t0−td. FIG. 11 is an illustrative diagram illustrating an example of an operation performed by linear motor system 10a shown in FIG. 9, showing a state at time t=t0. Examples of operations performed by linear motor system 10a will be described with reference to FIGS. 10 and 11.

As shown in FIG. 10, at time t=t0−td, second amplifier 60b and third amplifier 60c calculate position deviation Δθ (t0−td) at time t=t0−td by subtracting the actual position of mover 18 at time t=t0−td from the instructed position of mover 18 at time t=t0−td. Then, second amplifier 60b that is set as the master axis transmits position deviation Δθ (t0−td) to fourth amplifier 60d without using controller 28a.

Next, at time t=t0, fourth amplifier 30d receives position deviation Δθ (t0−td) from second amplifier 60b without using controller 28a.

With linear motor system 10a as described above, first to fourth amplifiers 30a to 30d and the fifth to tenth amplifiers are capable of communicating with each other, and each of first to fourth amplifiers 30a to 30d and the fifth to tenth amplifiers includes transmitter/receiver 40. As described above, first to fourth amplifiers 30a to 30d and the fifth to tenth amplifiers are capable of communicating with each other, and thus can transmit position deviation Δθ (t0−td) without using controller 28a.

(Supplementary Description)

Up to here, Embodiment 1 and Embodiment 2 have been described as examples of the technique disclosed in the present application. However, the technique disclosed in the present application is not limited thereto, and is also applicable to embodiments and variations obtained by making modifications, replacements, additions, omissions, and the like as appropriate without departing from the scope of the present disclosure.

For example, in the embodiment given above, an example has been described in which linear motor system 10a includes controller 28a. However, the configuration is not limited thereto. For example, the linear motor system may not include a controller. In this case, each of the first to tenth amplifiers may include an instructor and a switcher.

In the foregoing description, switcher 36 is configured to select one or more coils from among a plurality of coils as one or more power supply target coils that serve as power supply targets, the one or more coils each including an entire region extending across opposite ends in the arrangement direction that faces permanent magnet 24. However, the configuration is not limited thereto. For example, in FIG. 1A, the entire region extending across opposite ends of second coil 20b faces permanent magnet 24 when viewed from the transverse direction. However, for example, even when second coil 20b does not partially face permanent magnet 24 when viewed from the transverse direction, as long as opposite ends of second coil 20b in the arrangement direction (X direction) face permanent magnet 24, second coil 20b may be selected as a power supply target coil.

INDUSTRIAL APPLICABILITY

The linear motor system according to the present disclosure is widely applicable to a transportation device and the like.

The invention claimed is:
1. A linear motor system comprising:
a stator including a plurality of coils that are arranged in a line;
a mover including a permanent magnet disposed opposite to the plurality of coils;
a switcher that performs: (i) selecting, from the plurality of coils, one or more coils each including a region that extends across opposite ends of each of the one or more coils in an arrangement direction and that faces the permanent magnet as one or more power supply target coils that serve as power supply targets; and (ii) switching the one or more power supply target coils in response to a movement of the permanent magnet; and
a plurality of control units provided in one-to-one correspondence with the plurality of coils,
wherein each of the plurality of control units includes:
a position deviation calculation unit that calculates a position deviation that is a difference between an instructed position of the mover and an actual position of the mover obtained by subtracting the actual position of the mover from the instructed position of the mover;
a speed control unit that generates a torque instruction based on the position deviation; and a current control unit that supplies power to the one or more power supply target coils based on the torque instruction, and when one or more control units out of the plurality of control units that correspond to the one or more power supply target coils are defined as one or more power supply target control units:

the one or more power supply target control units immediately before the switching transmit $\Delta\theta$ (t0−td), which is the position deviation at time t=t0−td, to one or more control units that serve as new one or more power supply target control units immediately after the switching; and the one or more control units that serve as the new one or more power supply target control units immediately after the switching:

(i) receive the position deviation $\Delta\theta$ (t0−td) at time t=t0;

(ii) calculate $\Delta\theta$ (t0), which is the position deviation at time t=t0, based on $\Delta\theta$ (t0)=$\Delta\theta$ (t0−td)+A−B, where A is a difference between the instructed position at time t=t0 and the instructed position at time t=t0−td, and B is a difference between the actual position at time t=t0 and the actual position at time t=t0−td; and (iii) supply power to the one or more power supply target coils by using the position deviation $\Delta\theta$ (t0) when the new one or more power supply target control units immediately after the switching serve as the one or more power supply target control units.

2. The linear motor system according to claim 1, further comprising a superordinate control unit that transmits the instructed position to the plurality of control units, wherein the position deviation $\Delta\theta$ (t0−td) is transmitted to the one or more control units that serve as the new one or more power supply target control units immediately after the switching via the superordinate control unit.

3. The linear motor system according to claim 2, further comprising a filter that attenuates a high-frequency component of a position instruction from the superordinate control unit.

4. The linear motor system according to claim 1, further comprising a plurality of displacement detectors that are provided in one-to-one correspondence with the plurality of coils and the plurality of control units, wherein the one or more control units that serve as the new one or more power supply target control units immediately after the switching calculate a difference between a displacement of the mover at time t=t0−td and a displacement of the mover at time t=t0 based on a result of detection of corresponding one of the plurality of displacement detectors, and use the difference as difference B.

5. The linear motor system according to claim 1, wherein the one or more control units that serve as the new one or more power supply target control units immediately after the switching serve as the one or more power supply target control units at time t=t0.

6. The linear motor system according to claim 1, further comprising a plurality of position detectors provided at opposite ends of each of the plurality of coils in the arrangement direction, wherein, in each of the plurality of coils, when one of the position detectors that is provided on a forward side in a moving direction of the permanent magnet in the arrangement direction detects a leading end of the permanent magnet, the switcher selects the coil on which the position detector is disposed as one of the one or more power supply target coils, and when another one of the position detectors that is provided on a rearward side in the moving direction of the permanent magnet in the arrangement direction detects a trailing end of the permanent magnet, the switcher does not select the coil on which the position detector is disposed as the one of the one or more power supply target coils.

* * * * *